Patented June 25, 1929.

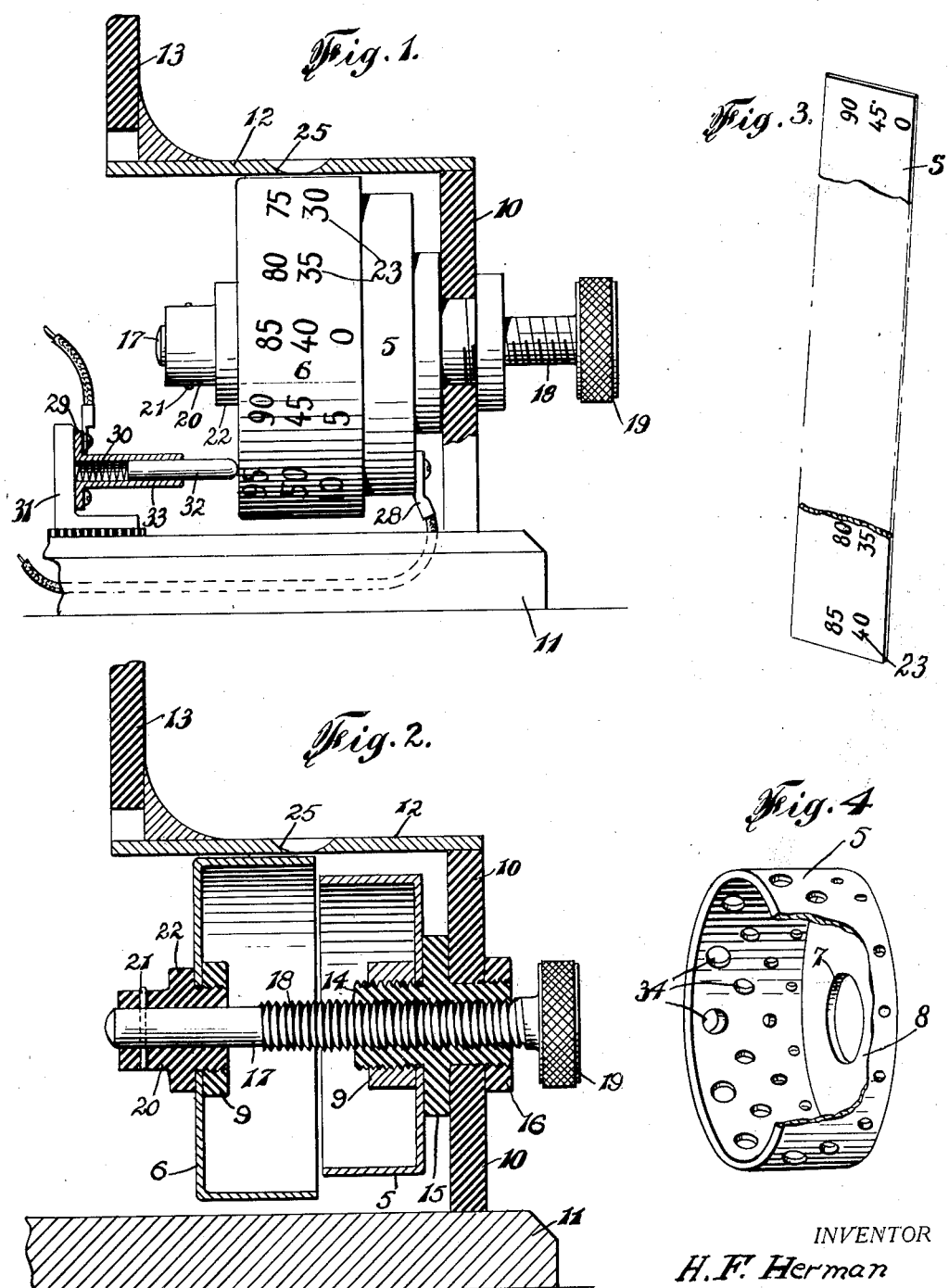

1,718,783

UNITED STATES PATENT OFFICE.

HENRY F. HERMAN, OF CHAPPAQUA, NEW YORK, ASSIGNOR TO STRAITLINE RADIO CORPORATION, OF NEW YORK, N. Y., A CORPORATION OF NEW YORK.

COMBINED ELECTRIC CONDENSER AND INDICATOR.

Application filed December 11, 1926. Serial No. 154,276.

This invention relates to variable electric condensers particularly adapted for use in radio receiving apparatus, although it may be used for other purposes, wherein the electrodes of the condenser are arranged with a cylindrical wall portion and adapted to have telescopable adjustment relative to each other to increase or decrease the capacity of the condenser, and it is the object of the invention to provide an electric condenser of this character which is simple and cheap in structure and highly efficient in use.

It is a further object of the invention to provide an electric condenser of this character wherein one electrode is adapted to have rotative and telescoping adjustment relative to the other electrode, and the adjustable electrode is adapted to also serve as a dial by arranging indices in spiral form about the periphery and the mounting of the condenser in the enclosing casing or cabinet of a radio receiving apparatus in relation to a window therein through which the indices on the one electrode are adapted to be consecutively exposed by and in accordance with the adjustment of the condenser to indicate such adjustment.

It is another object of the invention to provide an improved constructed and arranged electric condenser whereby the inductance capacity of the electrodes may be progressively increased or decreased as the electrodes are adjusted relative to each other.

A further object of the invention relates to improved means for connecting the condenser in an electric circuit or circuits.

In the drawing accompanying and forming a part of this specification I have shown an embodiment of the invention wherein Figure 1 is a side elevation, partly in section, of an electric condenser showing the same mounted in the enclosing casing or cabinet of a radio receiving apparatus, only so much of the casing being shown as is essential to an understanding of the invention.

Figure 2 is a sectional view of the parts shown in Figure 1 to show the mounting of the condenser and showing the electrodes in separated relation.

Figure 3 is a perspective view of a strip arranged with indicator indices and adapted to be attached to the periphery of the cylindrical portion of one of the electrodes to adapt said electrode to also serve as an indicating dial; and Figure 4 is a perspective view showing a modified construction and arrangement of the condenser electrodes whereby to progressively increase or decrease the inductance capacity of the condenser proportionally with the adjustment of the condenser.

In carrying out the embodiment of the invention illustrated in the drawing there is provided a pair of electrodes 5 and 6, each electrode being arranged with a cylindrical portion or plate and shown as of cupped or drum shape and are mounted with the open ends in opposed relation as shown in Figure 2. The electrodes are preferably of a one-piece integral structure with a central perforation 7 in the base 8 of each electrode.

The electrode 5 is mounted in fixed position, shown in the present instance as mounted on the front panel 10 of dielectric material of a radio receiving casing or cabinet, said panel extending vertically upward from a base 11 and interposed between said base and a shelf 12 extending forward from a closure member 13 of the casing, only a portion of which is shown.

The electrode 5 is mounted on a sleeve 14 of insulator material extended through the perforation 7 with the base 8 of the electrode held in abutting relation to an annular enlargement 15 of said sleeve by means of a nut 19 threaded onto the sleeve. The sleeve is mounted upon the panel 10 by engaging the opposite end of the sleeve in an opening in the panel and securing the same to the panel by a nut 16 threaded onto the sleeve at the outer side of the panel.

The electrode 6 is carried by a spindle 17 mounted axially in the sleeve 14 to have rotative and axial movement and the mounting of said electrode on the spindle is such that as the spindle is rotated participating movement is imparted to the electrode 6 and said electrode adjusted toward or away from the electrode 5 according to the direction in which the spindle is rotated. The electrode 6 is of greater diameter than the electrode 5 and as it is moved toward and away from the electrode 5 it will be moved into telescoping and spaced relation thereto. To impart this telescoping movement to the electrode 6 relative to the electrode 5 the spindle has a threaded portion 18 for connection with a threaded bore in the sleeve 14, whereby as the spindle is rotated, which is facilitated by a knurled button or knob 19 at the outer end of the spindle, longitudinal movement is imparted to said spindle due to the sleeve 14 being fixed. At the opposite end of the spindle there is mounted a sleeve 20 of insulation material and fixed to the spindle by a pin 21. The electrode 6 is mounted on the sleeve 20 with the base 8 thereof held in abutting relation to an annular enlargement or shoulder 22 by a nut 23 threaded onto the sleeve at the inner side of the electrode.

To indicate the adjustment of the condenser indices 24 are arranged in spiral form about the periphery of the electrode 6, said indices reading from a point at the open end of the electrode. These indices may be arranged directly in the material of the electrode 6, as by etching or otherwise and then filling in the etched characters with a material of a color which contrasts to the color of the material of the electrode whereby the indices may be readily observed and read. Or if desired such indices may be printed on a strip S of suitable material, such as celluloid or paper, which strip is wrapped around the periphery of the electrode 6 and attached or secured thereto as by an adhesive. By this arrangement the electrode 6 also serves as an indicator dial to indicate the adjustment of the condenser. The periphery of the rotatable electrode 6 lies contiguous to the inner surface of the shelf 12 of the casing in relation to an opening or window 25 through which to successively expose the indices for visual observation exterior of the casing as the electrode 6 is rotated and axially adjusted through the rotation of the spindle 17 by the knob 19. To facilitate the reading of the indices through the window, the wall of the window is arranged to converge from the outer surface of the shelf to the inner surface thereof, whereby the window at the outer side will be of greater area than at the inner surface, and the wall of said window may be provided with a phosphorescent material to provide a luminated zone and thus facilitate the reading of the indices.

To connect the electrodes of the condenser in the circuit of a source of electric energy one terminal of an electric current conductor 26 arranged in a channel or groove 27 (Figure 1) in the under surface of the base of the casing is connected to the electrode 5, as at 28. The other terminal of the conductor is connected, as at 29, to a carrier 30, supported by a bracket 31 insulated from the base 11, for a contact pin 32. The contact carrier 30 is of tubular form and conducting material and the contact pin is mounted therein and normally urged outward into engagement with the base of electrode 6 by a spring 32 to have a rubbing contact with said electrode. In operation it will be obvious that with the condenser electrodes in the position shown in Figure 2 the capacity value of the condenser is at its minimum, and that by adjusting the electrode 6 into telescoping relation with the electrode 5 the capacity value of the condenser is progressively increased or decreased depending upon the direction and amount of the adjustment of the electrodes relative to each other.

To vary the capacity settings of the condenser electrodes to produce the effect commonly termed as straight-line frequency reading of the dial and thereby facilitate tuning when utilizing the condenser in radio receiving apparatus portions of the cylindrical wall or plate of either one or both of the electrodes is removed. This result may be accomplished by removing portions of the electrode 5, as by drilling holes 34 in the circular wall or plate of said electrode, these holes being of greater area adjacent the open end of the electrode and gradually reduced in size toward the base 8 of said electrode, as clearly shown in Figure 4, and thereby vary the capacity inductance in predetermined ratio.

Having thus described my invention, I claim:

1. In an electric condenser, a pair of cup shape electrodes one of which is fixedly mounted, a spindle mounted to extend axially through and insulated from the fixed electrode to have rotative and axial movement, means for mounting the other electrode on and insulating the same from the spindle to participate in the axial and rotative movement therewith and have movement relative to the fixed electrode, and indices spirally arranged on the periphery of the rotatable electrode for the purpose specified.

2. In an electric condenser, a pair of cup shaped electrodes one of which is fixedly mounted on and insulated from a support, a spindle mounted axially in and extended through the support of the fixed electrode to have rotative and axial movement arranged with means at the outer end to manipulate the spindle, the other electrode being fixedly mounted on and insulated from the spindle to participate in the axial movement thereof and adjustment relative to the fixed electrode, and means to connect the electrodes in an electric circuit.

3. In an electric condenser, a pair of cup shaped electrodes one of which is fixedly mounted on and insulated from a support, a spindle mounted in the fixed electrode support to have rotary and axial movement, the other electrode being mounted on and insulated from the spindle and participating in the movement of the spindle to adjust the same relative to the fixed electrode, a strip attached to and extending around the periphery of the rotatable electrode having indices thereon arranged in a spiral formation for the purpose specified.

4. In an electric condenser, a pair of cup shaped electrodes one of which is fixedly mounted, a spindle mounted axially of and insulated from the fixed electrode to have rotative and axial movement, the other electrode being mounted on and insulated from the spindle to participate in the movement thereof and have axial movement relative to the fixed electrode, an electric contact to have rubbing contact with the movable electrode, a tubular carrier for said contact of conducting material and in electrical connection with the first contact and arranged for connection of an electric conductor, means in said carrier for yieldingly urging the one contact into engagement with the electrode, and a conductor electrically connected to the fixed electrode for connecting the condenser in an electric circuit.

5. The combination with a casing, of an electric condenser comprising a pair of electrodes and each electrode having a cylindrical wall and one electrode mounted in fixed position in the casing, a spindle mounted in the casing coaxially of and insulated from the fixed electrode to have rotative and axial movement and having a button at one end exterior of the casing for rotating the spindle, and the other electrode mounted on and insulated from said spindle to participate in the movement thereof and the cylindrical wall thereof to have telescopable movement relative to the cylindrical wall of the fixed electrode, and said electrode mounted on the spindle having indices spirally arranged on the periphery adapted to be successively exposed through a window in the casing as said electrode participates in the rotative and axial movement of the spindle.

6. In an electric condenser, a pair of cup shaped axially arranged electrodes each electrode having a cylindrical wall, one of said electrodes being mounted in fixed position and the other electrode mounted to have rotative movement and the cylindrical wall telescoping adjustment relative to the cylindrical wall of the fixed electrode and having spirally arranged indices upon the periphery thereof, means to connect said electrodes in an electric circuit, and a casing in which said condenser is mounted arranged with a window through which to expose the indices on the adjustable electrode are adapted to be exposed.

Signed at the city of New York, in the county of New York and State of New York, this 25th day of November, 1925.

HENRY F. HERMAN.